(12) United States Patent
Nitto et al.

(10) Patent No.: US 7,113,237 B2
(45) Date of Patent: Sep. 26, 2006

(54) LIQUID CRYSTAL DISPLAY DEVICE WITH REINFORCED SIDE

(75) Inventors: Eiji Nitto, Kawasaki (JP); Hirofumi Miyamoto, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 38 days.

(21) Appl. No.: 10/804,323

(22) Filed: Mar. 19, 2004

(65) Prior Publication Data

US 2004/0189889 A1 Sep. 30, 2004

(30) Foreign Application Priority Data

Mar. 31, 2003 (JP) .............................. 2003-094782

(51) Int. Cl.
*G02F 1/1333* (2006.01)
(52) U.S. Cl. ........................... 349/58; 349/59; 361/681
(58) Field of Classification Search .................. 349/58, 349/59; 361/681
See application file for complete search history.

(56) References Cited

U.S. PATENT DOCUMENTS

| 5,835,139 | A  | * | 11/1998 | Yun et al. ..................... 349/58 |
| 6,064,565 | A  |   | 5/2000  | Ishihara et al. ............. 361/681 |
| 6,330,148 | B1 |   | 12/2001 | Won et al. ................... 361/681 |
| 6,421,231 | B1 | * | 7/2002  | Jung ........................... 361/681 |
| 6,456,343 | B1 | * | 9/2002  | Kim et al. .................... 349/58 |
| 6,480,245 | B1 | * | 11/2002 | Sakamoto et al. ............ 349/59 |
| 2001/0035711 | A1 |   | 11/2001 | Itoh ............................ 349/58 |
| 2001/0050732 | A1 | * | 12/2001 | Okamoto et al. ............. 349/58 |

FOREIGN PATENT DOCUMENTS

| JP | 07099394   | 4/1995  |
| JP | 10282899   | 10/1998 |
| JP | 11085319   | 3/1999  |
| JP | 11305209   | 11/1999 |
| JP | 2000206900 | 7/2000  |
| JP | 2001-117084| 4/2001  |
| JP | 2001305984 | 11/2001 |

* cited by examiner

*Primary Examiner*—Huyen Ngo
(74) *Attorney, Agent, or Firm*—Greer, Burns & Crain, Ltd

(57) ABSTRACT

The liquid crystal display device has a liquid crystal panel, a light guiding plate for illuminating the liquid crystal panel, a bezel covering a periphery of the liquid crystal panel, a frame on which the liquid crystal panel is mounted, a screw for securing a side wall of the bezel to the frame, and a rear cover having a portion which extends from a back side of the light guiding plate beyond the position of the screw and which has a hole through which the screw passes. A portion of the side surface fixing mechanism in the vicinity of the fixing screw is reinforced by the portion of the rear cover which is coupled with the side wall of the bezel and the side wall of the frame.

7 Claims, 5 Drawing Sheets

LIQUID CRYSTAL DISPLAY DEVICE WITH REINFORCED SIDE

BACKGROUND OF THE INVENTION

1. Field of the Invention

The present invention relates to a liquid crystal display device.

2. Description of the Related Art

A liquid crystal display device includes a liquid crystal panel, in which a liquid crystal is inserted between a pair of substrates, and a lighting device. The liquid crystal panel includes a pair of polarizers. The lighting device constitutes a front light or a back light and includes a light guiding plate.

The liquid crystal panel and the lighting device are provided in a housing. The housing is comprised of, for examples, a bezel that covers the periphery of the liquid crystal panel and a rear cover (chassis) that accommodates the lighting device. Provision is also made of a frame on which the liquid crystal panel is placed and which is secured to the rear cover.

In order to reduce the size of the liquid crystal display device, the size of an outer peripheral portion of the liquid crystal display device is reduced and a side surface securing mechanism is adopted, in which the side wall of the bezel is secured to the chassis or the frame by screws (refer to Japanese Unexamined Patent Publication (Kokai) No. 7-99394, No. 11-305209, and No. 2001-305984, for example). In the side surface securing mechanism, the side wall of the bezel is provided with holes and the side surface of the chassis or the frame is provided with threaded holes. The screws are inserted through the holes of the side wall of the bezel and threaded into the threaded holes of the side wall of the chassis or the frame.

However, in the side surface securing mechanism, holes are pierced in the side wall of the bezel, threaded holes are provided in the chassis or the frame, and these members are fastened by the screws, so the fastening portions of the bezel and the chassis or the frame are subjected to stress, and a problem arises in that the strengths of the fastening portions of the bezel and the chassis or the frame are reduced.

SUMMARY OF THE INVENTION

The object of the present invention is to provide a liquid crystal display device in which a portion of the side surface securing mechanism in the vicinity of the screw is strengthened to enhance the strength of the liquid crystal display device as a whole.

According to the present invention, a liquid crystal display device comprises a liquid crystal panel, a light guiding plate for illuminating the liquid crystal panel, a bezel covering a periphery of the liquid crystal panel, a frame on which the liquid crystal panel is mounted, a screw for connecting a side wall of the bezel to the frame, and a rear cover having a portion extending from a back side of the light guiding plate beyond the position of the screw and having a hole through which the screw passes.

With this structure, when the side wall of the bezel is connected to the frame by the screw, a portion of the rear cover is located between the side wall of the bezel and the frame and the screw passes through the hole provided in the portion of the rear cover, so that the portion of the rear cover can be fastened to the side wall of the bezel and the frame by the screw. Therefore, a portion of the side surface securing mechanism in the vicinity of the screw is reinforced by the portion of the rear cover, thus resulting in an increase in the strength and reliability of the liquid crystal display device.

Also, according to the present invention, a liquid crystal display device comprises a liquid crystal panel, a light guiding plate for illuminating the liquid crystal panel, a bezel covering a periphery of the liquid crystal panel, a frame on which the liquid crystal panel is mounted, a screw for connecting a side wall of the bezel to the frame, a rear cover provided on a rear surface of the light guiding plate, and a fixing member securing a portion of the rear cover and the side wall of the bezel together.

With this structure, the screw connects the side wall of the bezel to the frame, and the fixing member secures the rear cover and the side wall of the bezel together. The frame is located between the rear cover and the side wall of the bezel and consequently, the fixing member can secure the portion of the rear cover, the side wall of the bezel and the frame together, without making the shape of the rear cover complicated. Consequently, a portion of the side surface securing mechanism in the vicinity of the screw can be reinforced by the fixing member, and the strength and reliability of the liquid crystal display device can be enhanced.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Embodiments of the present invention will be explained with reference to the drawings.

Figure 1:
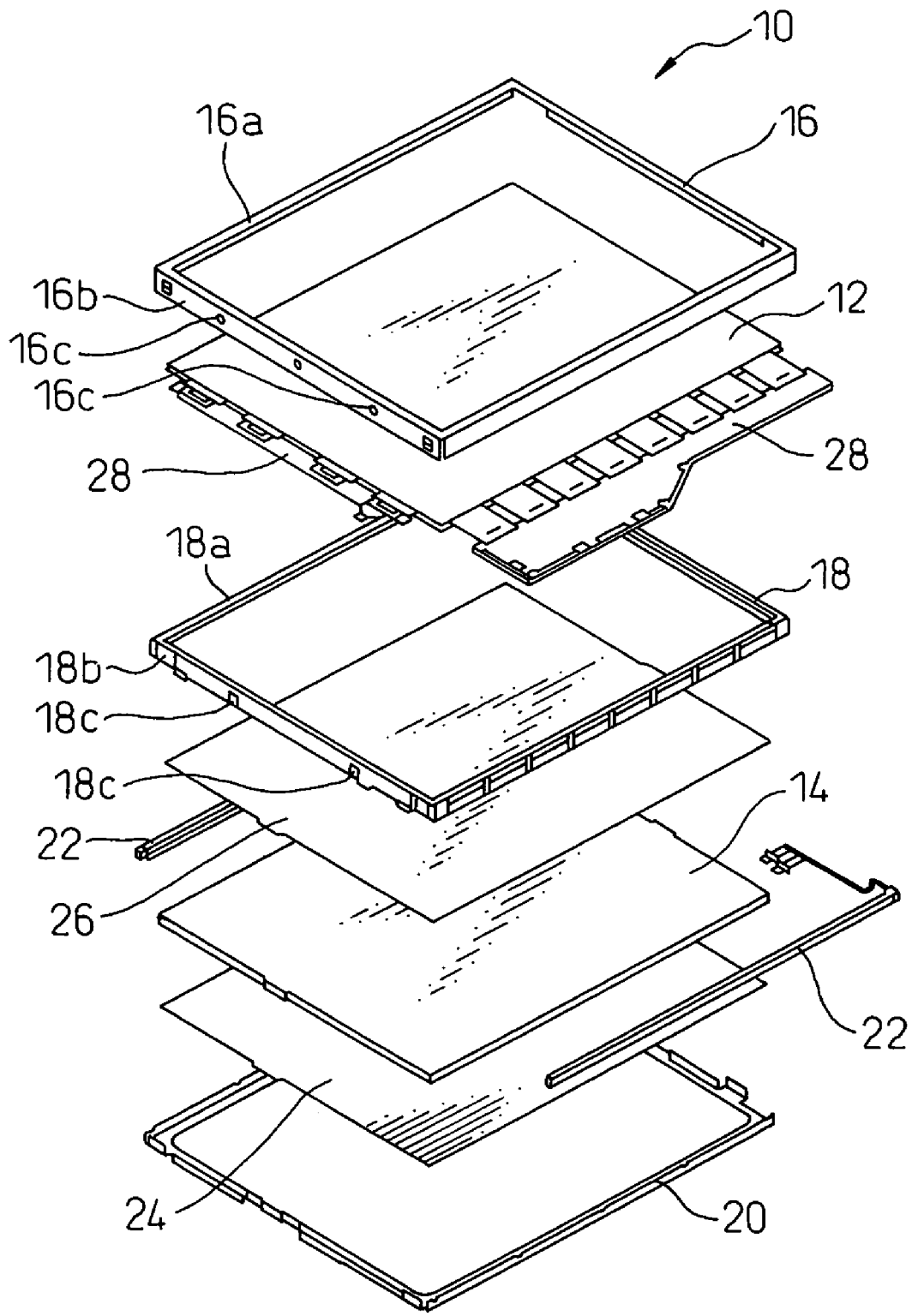
FIG. 1 is an exploded perspective view of a liquid crystal display device according to the present invention.
Figure 2:
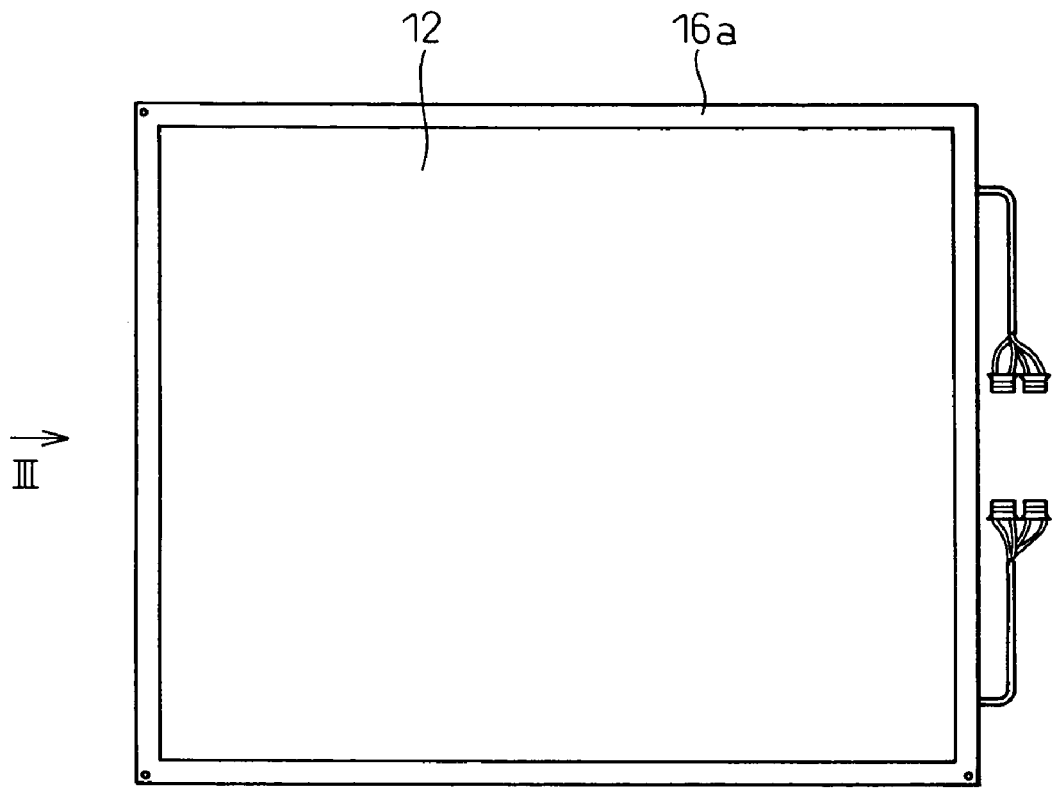
FIG. 2 is a front view of the liquid crystal display device.
Figure 3:
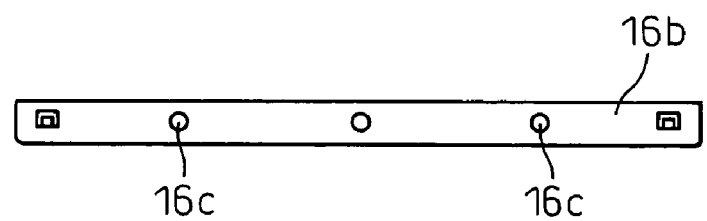
FIG. 3 is a side view of the liquid crystal display device, as viewed from the direction of the arrow III in FIG. 2.

FIG. 1 is an exploded perspective view of a liquid crystal display device according to the present invention. FIG. 2 is a front view of the liquid crystal display device. FIG. 3 is a side view of the liquid crystal display in FIG. 2, as viewed from the direction of the arrow III in FIG. 2.

The liquid crystal display device 10 comprises a liquid crystal panel 12, a light guiding plate 14 for illuminating the liquid crystal panel 12, a bezel (upper housing member) 16, a carriage frame 18 and a rear cover (chassis) 20. The liquid crystal panel 12 is comprised of a liquid crystal held between a pair of substrates and can include one or a pair of polarizer(s).

The light guiding plate 14 is a component of a backlight and is made of highly transparent resin, such as acrylic resin. The backlight includes a light source and a reflector 22, which are arranged on the side of the light guiding plate 14.

The light source is arranged along the side surface of the light guiding plate 14 and in the reflector 22 which opens toward the light guiding plate 14. The reflector 22 is typically made of SUS, iron or aluminum, etc. and is provided, on its light source side, with a vapor-deposited silver layer or a white reflective layer and treated so as to effectively reflect the light emitted from the light source.

The liquid crystal display device 10 includes a reflecting sheet 24 arranged below the light guiding plate 14 to reflect the light leaking from the light guiding plate 14 back to the interior of the light guiding plate 14, and an optical sheet 26 arranged above the light guiding plate 14 to gather and/or diffuse the light emitted from the light guiding plate 14 in order to effectively emit the light toward the liquid crystal panel 12. The liquid crystal display device 10 also includes a control circuit board 28 connected to the liquid crystal panel 12. The control circuit board 28 transmits external signals to the liquid crystal panel 12 and controls the display of images on the liquid crystal panel 12.

Figure 4:
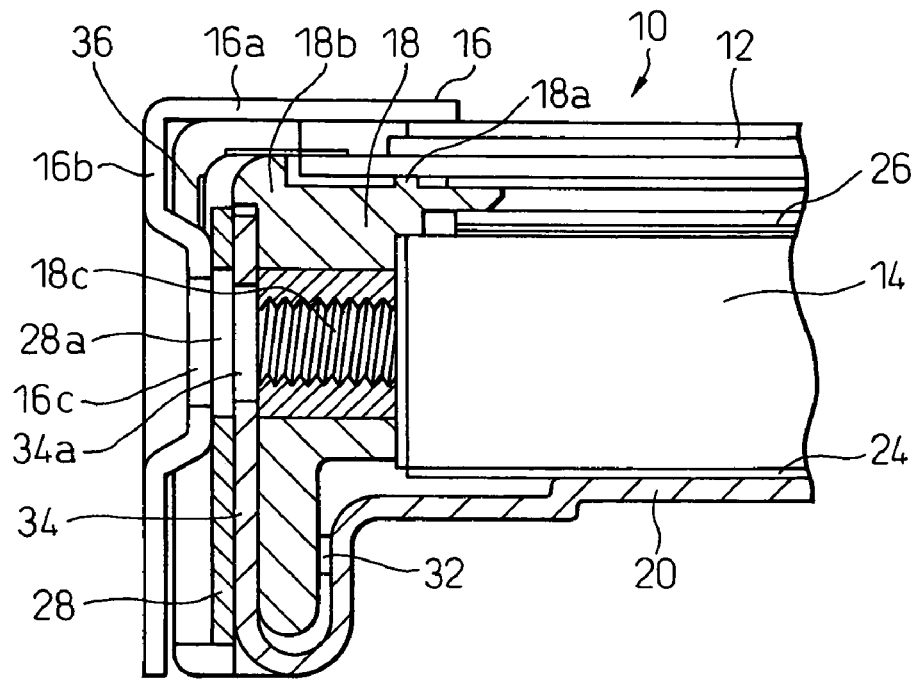
FIG. 4 is an enlarged sectional view of a part of the liquid crystal display device.
Figure 5:
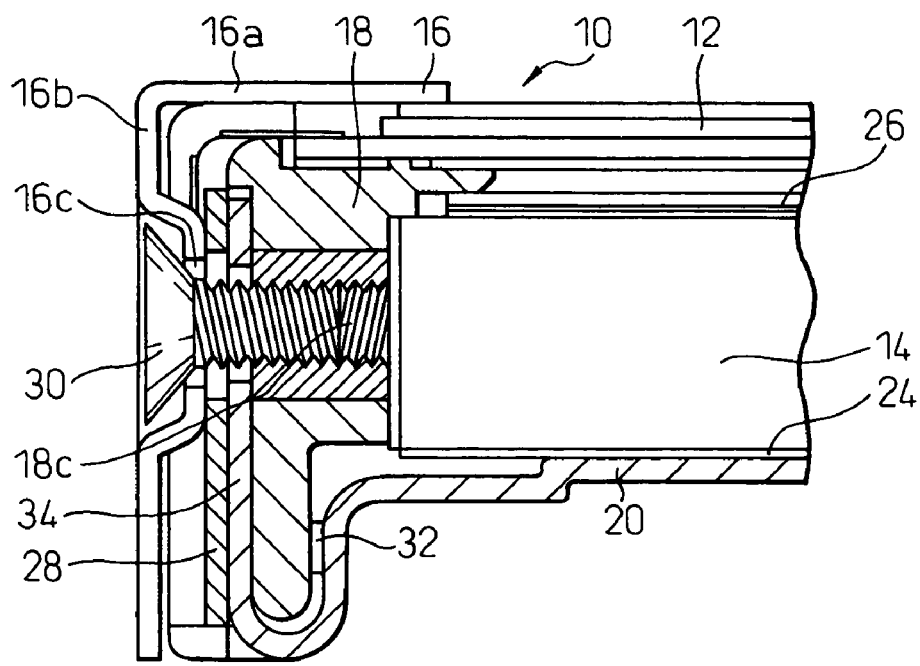
FIG. 5 is a sectional view of the liquid crystal display device in FIG. 4, with a screw engaged.

FIG. 4 is an enlarged sectional view of a part of the liquid crystal display device. FIG. 5 is a sectional view of the liquid crystal display in FIG. 4, with the screw engaged. In FIGS. 1 through 5, the bezel 16 is typically made of a metal such as SUS, iron or aluminum, etc. The bezel 16 has an upper wall 16a which covers the periphery of the liquid crystal panel 12 and has an opening through which the display portion of the liquid crystal panel 12 is exposed to the outside, and a side wall 16b bent substantially perpendicular from the upper wall 16a. The side wall 16b has holes 16c through which screws 30 are inserted.

The carriage frame 18 is made of, for example, a resin mold such as polycarbonate, etc., or a metal such as SUS, aluminum, etc. The carriage frame 18 is provided with an upper placement portion 18a on which the liquid crystal panel 12 is placed, a positioning portion 18b for positioning the liquid crystal panel 12, and threaded holes 18c which open in the side surface. The screws 30 are engaged in the threaded holes 18c of the carriage frame 18 through the holes 16c of the side wall 16b of the bezel 16. The threaded holes 18c are directly pierced in the carriage frame 18, or are provided in the form of nuts embedded in the carriage frame 18. The carriage frame 18 surrounds the light guiding plate 14.

The rear cover 20 covers the bottom of the light guiding plate 14 and has side walls which extend upwards to an intermediate portion of the side surface of the light guiding plate 14, to form such a structure to accommodate the reflector 22 and the light guiding plate 14. Like the carriage frame 18, the rear cover 20 is made of, for example, a resin mold such as polycarbonate, etc. or a metal such as SUS, aluminum, etc.

The rear cover 20 is connected to the carriage frame 18 by, for example, claws 32 provided on the carriage frame 18. The rear cover 20 has portions 34 which extend from the rear surface side of the light guiding plate (backlight) 14, around the bottom end of the carriage frame 18 and upward beyond the position of the screws 30. The portions 34 extend along the side surface of the carriage frame 18 between the carriage frame 18 and the side wall 16b of the bezel 16 and have holes 34a through which the screws 30 inserted from the holes 16c of the side wall 16b of the bezel 16 pass. The control circuit board 28 is located between the side wall 16b of the bezel 16 and the portions 34 of the rear surface cover 20, and is provided with holes 28a through which the screws 30 pass. The control circuit board 28 is connected to electrodes provided on one of the substrates of the liquid crystal panel 12 and to an external control device, through a flexible printed circuit board 36.

A side surface securing mechanism comprising the hole 16c of the side wall 16b of the bezel 16, the hole 34a of the portion 34 of the rear cover 20, the threaded hole 18c of the carriage frame 18 and the screw 30 is provided at at least one position and preferably at a plurality of positions on the periphery of the bezel 16.

With this structure, when the screws 30 connect the side wall 16b of the bezel 16 with the carriage frame 18, the portions 34 of the rear cover 20 are located between the side wall 16b of the bezel 16 and the carriage frame 18, and the screws 30 are inserted in the holes 34a of the portions 34 of the rear cover 20, so that the portions 34 of the rear cover 20 are coupled with the side wall 16b of the bezel 16 and the carriage frame 18, through a screw engagement. Consequently, the portion of the side surface securing mechanism in the vicinity of the screw is reinforced by the portions 34 of the rear cover 20 to thereby enhance the strength and reliability of the liquid crystal display device. Further, as the bezel 16, the control circuit board 28, the portions 34 of the rear cover 20 and the carriage frame 18 can be collectively fixed together by the screws 30, the fixing strength of the product increases and, thus, the internal components can be protected against external shocks.

Figure 6:
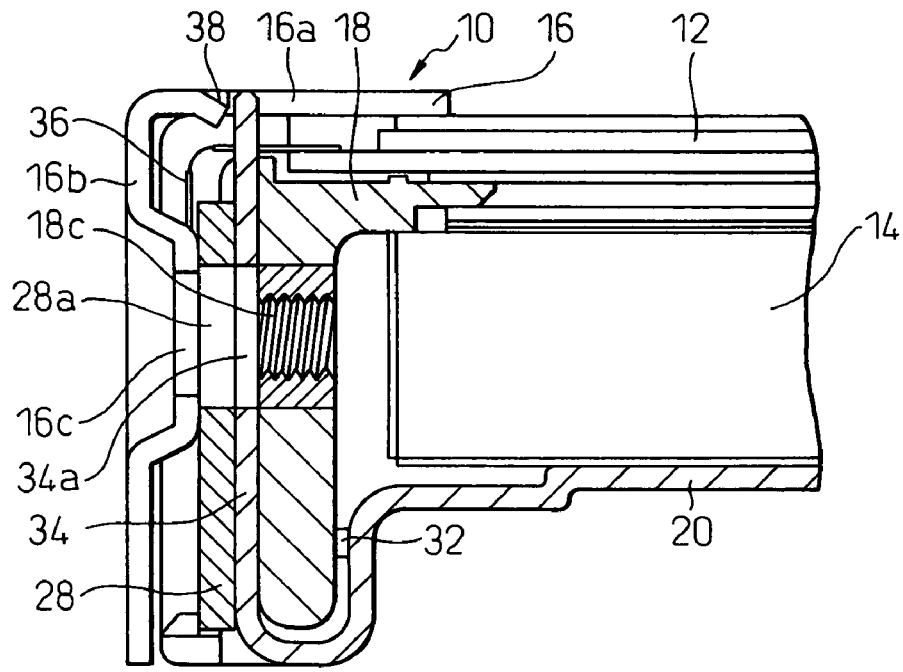
FIG. 6 is a sectional view of a liquid crystal display device according to another embodiment of the present invention.

FIG. 6 is a sectional view of a liquid crystal display device according to another embodiment of the present invention. The embodiment shown in FIG. 6 is substantially identical to that shown in FIGS. 4 and 5, except for the following points. Namely, the portions 34 of the rear cover 20 in the embodiment shown in FIGS. 4 and 5 terminate directly above the screws 30, whereas the portions 34 of the rear cover 20 in the embodiment shown in FIG. 6 extend beyond the location of the screws 30 up to the surface of the bezel 16, and the bezel 16 has holes 38 in which the portions 34 of the rear cover 20 are fitted.

With this structure, not only can the same operation and effects as those of the embodiment shown in FIGS. 4 and 5 be obtained but, also, as the front ends of the portions 34 of the rear cover 20 are inserted in the holes 38 of the bezel 16 when the bezel 16 is assembled, the fixing strength of the bezel 16 and the rear cover 20 can be increased, so that the internal components can be protected against an external shock.

Figure 7:
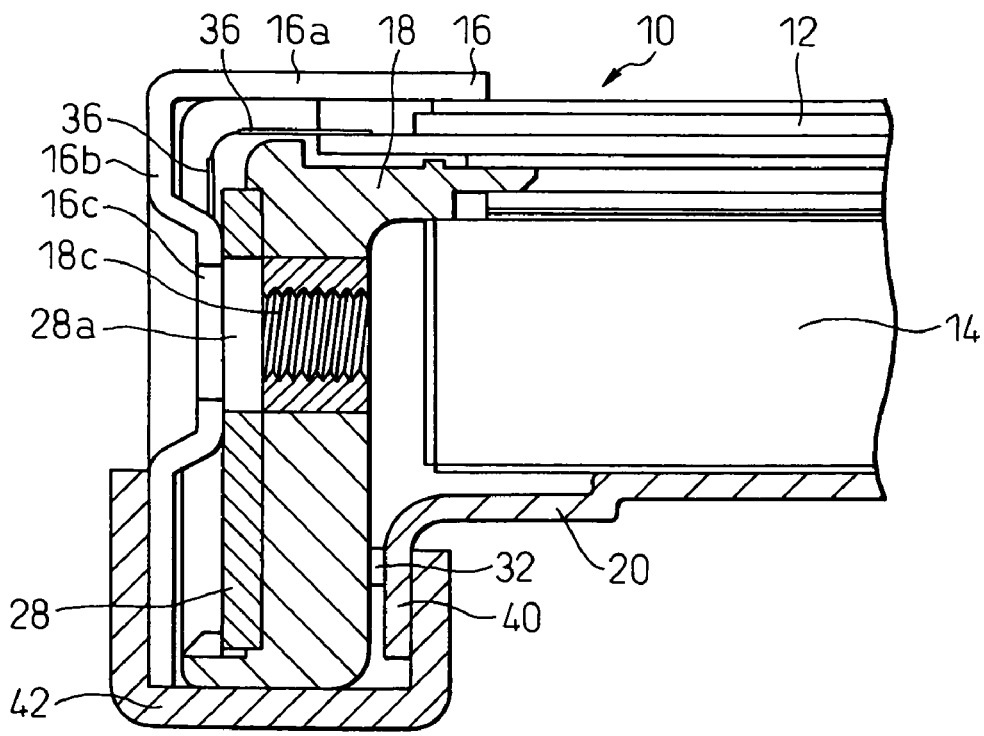
FIG. 7 is a sectional view of a liquid crystal display device according to a further embodiment of the present invention.

FIG. 7 is a sectional view of a liquid crystal display device according to a further embodiment of the present invention. The embodiment shown in FIG. 7 is substantially identical to that shown in FIGS. 4 and 5, except for the following points. In the embodiment in FIG. 7, the rear cover 20 does not have the portions 34 extending beyond the locations of the screws 30 but, instead, has portions 40 which extend substantially in parallel with the lower portion of the carriage frame 18. Furthermore, clips (fixing members) 42 which hold the lower part of the portions 40 of the rear cover 20 and the lower portion of the side wall 16b of the bezel 16 are provided. The clips 42 are substantially aligned with the axes of the screws 30 (the threaded holes 18c), as viewed from a direction orthogonal to the liquid crystal panel 12. The clips 42 have a substantially U-shaped cross section and are elastically deformable. It is also possible to engage the clips 42 in grooves which are provided in the portions 40 of the rear surface cover 20 and the side wall 16b of the bezel 16. The clips 42 are made of resin mold such as polycarbonate, or a hard metal such as SUS or aluminum.

With this structure, the side wall 16b of the bezel 16 is secured to the carriage frame 18 by the screws 30 and, in the vicinity of this side surface fixing mechanisms, the bezel 16, the control circuit board 28, the carriage frame 18 and the rear cover 20 can be collectively fixed together only by the clips 42 which are inserted from the rear surface of the liquid crystal display device to clip the bezel 16 and the rear cover 20 in the clip. Consequently, the fixing strength of the product increases and the internal components can be protected from external shocks.

Figure 8:
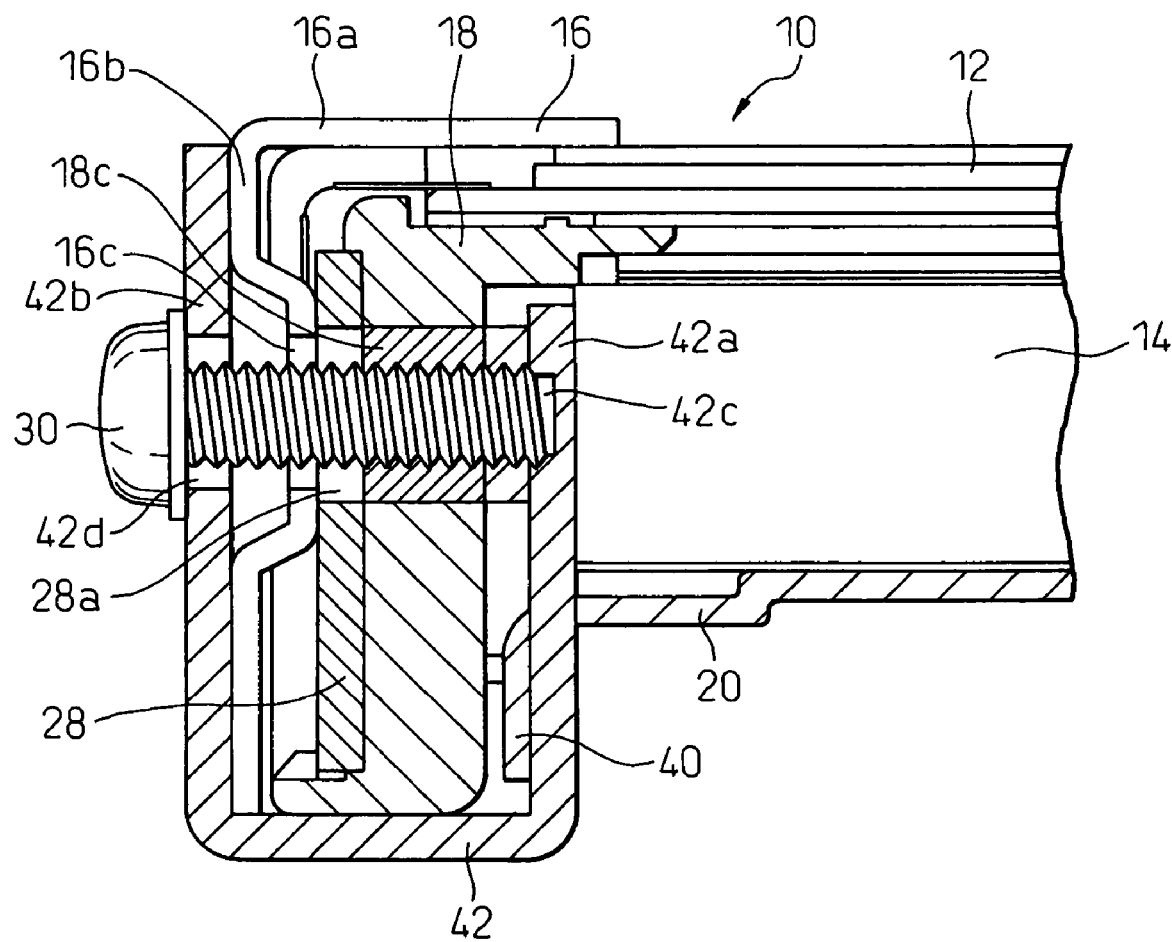
FIG. 8 is a sectional view of a liquid crystal display device according to a further embodiment of the present invention.

FIG. 8 is a sectional view of a liquid crystal display according to a further embodiment of the present invention. The embodiment shown in FIG. 8 is substantially identical to that shown in FIG. 7, except for the following points. Namely, according to the embodiment shown in FIG. 8, the clips (fixing members) 42, which hold the lower part of the portions 40 of the rear cover 20 and the lower portion of the side wall 16b of the bezel 16 together, are provided and the clip 42 has a first portion 42a which extends along the side surface of the carriage frame 18 and a second portion 42b which extends along the side surface of the bezel 16. The first portion 42a of the clip 42 is provided with a threaded hole 42c which is screw-engaged by the screw 30 and the second portion 42b is provided with a hole 42d in which the screw 30 is inserted. The screw 30 is engaged in the threaded hole 18c of the carriage frame 18 and in the threaded hole 42c of the first portion 42a of the clip 42, through the hole 42d of the second portion 42b of the clip 42 and the hole 16c of the side wall 16b of the bezel 16.

With this structure, the first portion 42a of the clip 42, the bezel 16, the control circuit board 28, the carriage frame 18, the rear surface cover 20 and the second portion 42b of the clip 42 can be collectively fixed together by the screw and, in the vicinity of the side surface securing mechanism, the bezel 16, the carriage frame 18, the rear cover 20 and the control circuit board 28 can be collectively fixed together by the clip 42 which is inserted from the rear surface of the liquid crystal display device to clip the bezel 16 and the rear cover 20. Therefore, the fixing strength of the product increases and the internal components can be protected from external shock.

As explained above, according to the present invention, even if the strength of the side surface fixing mechanism is reduced with the miniaturization of the periphery of the liquid crystal display device, it can be sufficiently reinforced and, hence, a highly reliable liquid crystal display device can be provided.

The invention claimed is:

1. A liquid crystal display device, comprising:
a liquid crystal panel;
a light guiding plate for illuminating the liquid crystal panel;
a frame on which the liquid crystal panel is mounted;
a bezel including an upper wall which covers a periphery of the liquid crystal panel and has an opening through which a display portion of the liquid crystal panel is exposed to the outside, and a side wall bent from the upper wall and covering a side wall of the frame;
a screw connecting the side wall of the bezel to the frame; and
a rear cover for housing the light guiding plate from a bottom side of the light guiding plate,
the rear cover having an extended portion which extends from a back side of the light guiding plate beyond a position of the screw, wherein the extended portion has a hole through which said screw passes, and wherein the extended portion is formed between the side wall of the frame and the side wall of the bezel, and
wherein a control circuit board connected to the liquid crystal panel is arranged between the side wall of the bezel and the frame.

2. A liquid crystal display device according to claim 1, wherein the frame has a threaded hole in which the screw is engaged.

3. A liquid crystal display device according to claim 1, wherein the frame surrounds the light guiding plate.

4. A liquid crystal display device according to claim 1, wherein the frame has a positioning means for positioning the liquid crystal panel.

5. A liquid crystal display device according to claim 1, wherein said portion of the rear cover extends to a front surface of the bezel and the bezel has a hole in which said portion of the rear cover can be fitted.

6. A liquid crystal display device according to claim 1, wherein the bezel, the extended portion, and the frame are in contact with one another at least at a periphery of portions connected together by the screw.

7. A liquid crystal display device according to claim 1, wherein the bezel, the control circuit board, the extended portion, and the frame are in contact with one another in this order at least at a periphery of portions connected together by the screw.

* * * * *